US011199657B2

(12) United States Patent
Wohlfeil et al.

(10) Patent No.: US 11,199,657 B2
(45) Date of Patent: Dec. 14, 2021

(54) ELECTRO-OPTICAL ASSEMBLY

(71) Applicant: ADVA OPTICAL NETWORKING SE, Meiningen (DE)

(72) Inventors: Benjamin Wohlfeil, Berlin (DE); Joerg-Peter Elbers, Furstenfeldbruck (DE); Rocco Matricardi, Stittsville (CA); Richard Mainardi, Hudson (CA)

(73) Assignee: ADVA OPTICAL NETWORKING SE, Meiningen (DE)

( * ) Notice: Subject to any disclaimer, the term of this patent is extended or adjusted under 35 U.S.C. 154(b) by 0 days.

(21) Appl. No.: 16/716,895

(22) Filed: Dec. 17, 2019

(65) Prior Publication Data

US 2020/0200971 A1    Jun. 25, 2020

(30) Foreign Application Priority Data

Dec. 21, 2018 (EP) .................................. 18215442

(51) Int. Cl.
*G02B 6/44* (2006.01)
*G02B 6/122* (2006.01)
(Continued)

(52) U.S. Cl.
CPC ......... *G02B 6/1225* (2013.01); *G02B 6/4274* (2013.01); *G02B 6/4292* (2013.01); *G02B 6/2856* (2013.01)

(58) Field of Classification Search
CPC .................................................. G02B 6/4236
See application file for complete search history.

(56) References Cited

U.S. PATENT DOCUMENTS 5,539,848 A * 7/1996 Galloway ............ G02B 6/4274
385/89
5,774,486 A * 6/1998 Jiang ........................ G02B 6/42
372/31

(Continued)

FOREIGN PATENT DOCUMENTS

WO    2018/165061 A1    9/2018

OTHER PUBLICATIONS

Doerr, C. et al. "Silicon photonics coherent transceiver in a ball-grid array package", Optical Fiber Communications Conference and Exhibition (OFC), Mar. 19-23, 2017.

*Primary Examiner* — Eric Wong
(74) *Attorney, Agent, or Firm* — Perry + Currier, Inc.

(57) ABSTRACT

An electro-optical assembly comprises a substrate having a support-surface, and a photonic integrated circuit (PIC) mounted with a contact surface on the support-surface. The (PIC) comprises an integrated optical waveguide structure defining at least two waveguide end faces, at an edge surface of the PIC, perpendicular to its contact surface, and forming optical ports. An optical coupling device, mounted with a contact surface on the support-surface, optically connects at least two optical fibers to the PIC and comprises an optical waveguide structure-defining at least two front waveguide end faces provided at a front edge surface thereof, perpendicular to its contact surface. The number of front waveguide end faces corresponds to the number of the waveguide end faces. The optical coupling device is positionable during an active positioning process to align the respective waveguide end faces. A method of manufacturing such an electro-optical assembly is also provided.

17 Claims, 6 Drawing Sheets

(51) Int. Cl.
    *G02B 6/42*     (2006.01)
    *G02B 6/28*     (2006.01)

(56) References Cited

U.S. PATENT DOCUMENTS

| | | |
|---|---|---|
| 7,066,660 B2 | 6/2006 | Ellison |
| 9,335,480 B1 | 5/2016 | Celo |
| 9,638,859 B1 | 5/2017 | Nuttall |
| 9,698,564 B1 | 7/2017 | Shubin et al. |
| 2002/0196998 A1 | 12/2002 | Steinberg et al. |
| 2004/0109649 A1* | 6/2004 | Mazotti ............... G02B 6/4292 385/94 |
| 2009/0022500 A1 | 1/2009 | Pinguet et al. |
| 2016/0004021 A1 | 1/2016 | Pelletier et al. |
| 2016/0334590 A1 | 11/2016 | Celo et al. |
| 2017/0003450 A1* | 1/2017 | Rickman ............... G02B 6/122 |
| 2018/0024299 A1 | 1/2018 | Leijtens et al. |
| 2018/0351684 A1* | 12/2018 | Osenbach ........ H04B 10/07955 |
| 2019/0018203 A1* | 1/2019 | Rosenberg ........... G02B 6/4292 |
| 2019/0391350 A1* | 12/2019 | Evans ................ G02B 6/3825 |

* cited by examiner

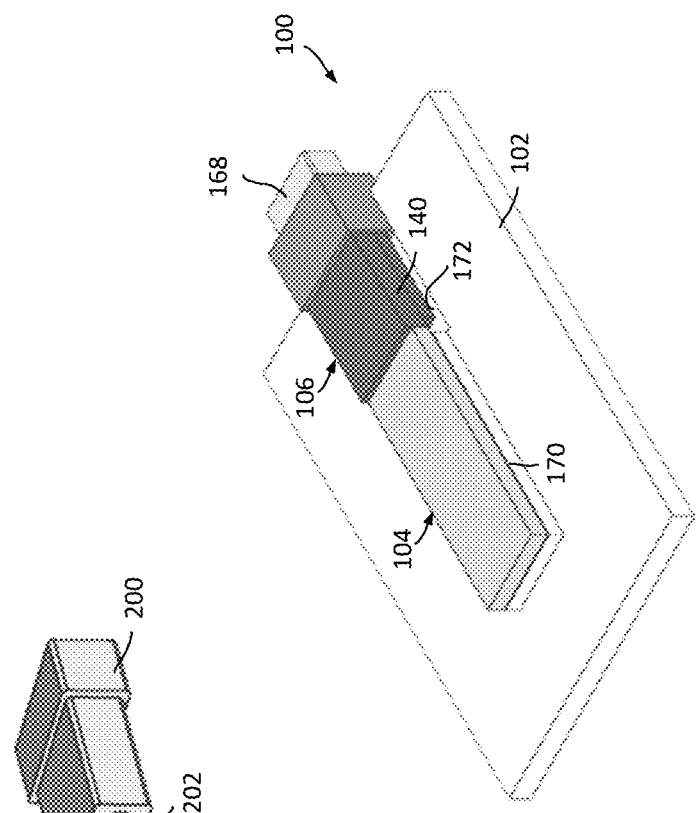
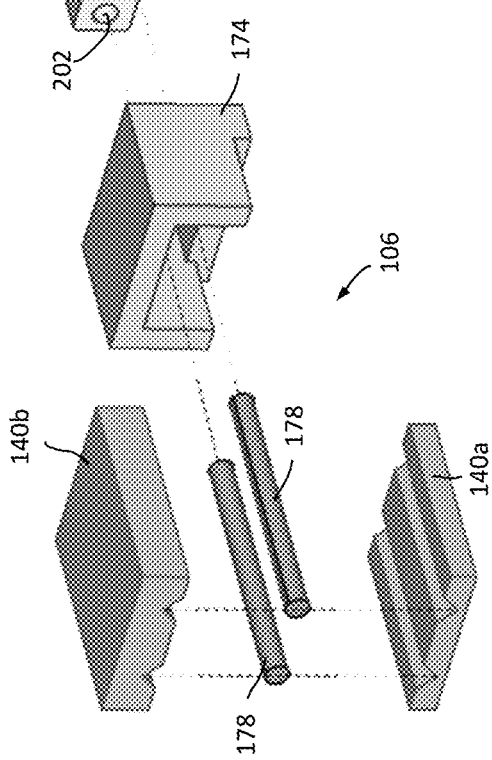
Fig. 5a
Fig. 5b

ELECTRO-OPTICAL ASSEMBLY

The invention relates to an electro-optical assembly comprising a substrate and a photonic integrated circuit which is configured to be connected to at least two optical fibers. Further, the invention relates to a method of manufacturing such an electro-optical assembly.

Coupling between an integrated waveguide provided on a photonic integrated circuit (PIC) and optical fibers is usually performed actively. That is, the relative position between an integrated waveguide and optical fiber is adjusted while light is transmitted over the connection or interface defined by an end face of the integrated waveguide and an opposed end face of the optical fiber. Usually, the optical fiber and the integrated waveguide are not in direct contact in these arrangements, giving the adjustment process between integrated waveguide and optical fiber six degrees of freedom, i.e. in all three translational and all three rotational degrees of freedom. In order to transmit the maximum power over the optical coupling, the optical axes of the integrated waveguide and the optical fiber must be optimally aligned with each other, provided that the end faces are perpendicular to the respective optical axis or that the gap between the end faces is filled by an immersion medium, e.g. a transparent epoxy resin, which must, of course, reveal a sufficiently low viscosity during the alignment process. Once the optical power of the optical signal that is transmitted over the connection reaches its maximum, the optimum relative position between the optical fiber and the integrated waveguide has been found and both can be fixed with respect to each other, e.g. by maintaining this position until a glue has completely hardened. The accuracy required depends on the dimensions of the optical fiber (a standard optical fiber has a core diameter of approximately 8-10.5 µm) and the integrated waveguide (here, varying sizes and geometries between a few microns and a few hundred nanometers are common depending—among others—on material properties and lithography process parameters). Of course, smaller cross-sectional waveguide dimensions require higher alignment precision.

In order to align an optical fiber with high precision in the plane perpendicular to the optical axis with respect to an end face of an integrated waveguide, grooves may be used, which are etched into the PIC and form a guide for the optical fiber. A desired geometry of a groove may be achieved by using a crystalline PIC substrate having a desired orientation and appropriate etching substances (e.g. potassium hydroxide, KOH). Once the groove has been created, the optical fiber can be fully inserted into the groove and thereby aligned with the integrated waveguide with a sufficiently high accuracy. Additionally, the optical fiber must be positioned in the axial direction (i.e. in the direction of the at least essentially parallel axes of both waveguides). The optical fiber may then be fixated by means of a cover or glue. Etching V-shaped grooves is, however, no standard etching method, and requires a relatively complex process. Moreover, an additional step of fixating each optical fiber in its correct position is required. The use of a cover or a glue for fixating a bare optical fiber brings along the disadvantage of having undesired influences on the optimum position thereof, as applying forces onto the bare fiber end (due to pressing a cover onto the fiber end or hardening of the glue) may result in a misalignment of the optical fiber with respect to the integrated waveguide. Further, using grooves and/or other mechanical alignment means directly on a PIC may result in damaging sensitive structures provided on the PIC.

Such optical assemblies that provide for a direct coupling between optical fibers and the PIC require adaptation of the optical mode in the waveguide structure of the PIC (at the connection interface) to the optical mode of the fiber to take place on the PIC. Most commonly, this problem is solved using surface grating couplers (see e.g. US 2009/0022500 A1), which emit light in the vertical direction. There are three disadvantages to this approach: Grating couplers have a limited bandwidth, vertical fibers require a large space above the silicon chip due to limited bend radius of the fiber and the vertical alignment prohibits the use of flip chip technology. A second solution to the problem of optical coupling is the use of inverted tapers (e.g. Doerr, C. et al. "Silicon photonics coherent transceiver in a ball-grid array package", Optical Fiber Communications Conference and Exhibition (OFC), 19-23 Mar. 2017), which couple horizontally and usually show compared to gratings—a negligible wavelength dependency. However, in most cases the spot sizes generated through the inverted tapers are still small compared to those of optical fibers. Therefore, lensed fibers or high numerical aperture fibers (US 2016/0004021 A1) are most commonly used in combination with inverted tapers. However, lensed fibers or lenses (U.S. Pat. No. 7,066,660 B2) are generally undesirable for an optical assembly since they constitute free space optics, which would require hermetic packaging.

An additional challenge lies in the active alignment of multiple optical fibers, since this requires the most labor intense steps in the overall assembly process. In order to alleviate this problem, U.S. Pat. No. 9,638,859 B1 describes an optical fiber alignment device which comprises a plate or substrate in which one or more grooves are provided. Optical fibers are inserted into these grooves and fixated using an epoxy resin or a glass plate (preferably for each fiber). A sufficiently accurate position of a PIC that comprises a waveguide structure to be coupled to the optical fibers is achieved by mutually engaging alignment features provided on the substrate and the PIC. In this way, a sufficiently accurate passive alignment process is permitted, wherein no grooves are required in the PIC. However, in many cases such a passive alignment is not accurate enough.

It is therefore an object of the present invention to provide an electro-optical assembly comprising a PIC, wherein an integrated waveguide structure of the PIC is connected or can easily be connected to at least two optical fibers with a minimum possible attenuation. It is a further object of the invention to provide a method of easily manufacturing such an electro-optical assembly.

The invention achieves these objects by the combination of features according to independent claims 1 and 13. Further advantageous embodiments are defined by the dependent claims.

The invention starts from the finding that coupling two or more optical fibers to a PIC can easily be done by using a coupling device that is separate from the PIC, wherein both of these components are mounted on a substrate, which preferably has a plate-like structure and may consist of a mechanically and thermally stable material, e.g. a ceramic material. Apart from the PIC and the coupling device, other components, especially electrical components like amplifiers, temperature control devices and the like may be provided on the substrate together with an appropriate wiring and contacting means.

According to the invention, the PIC is mounted with a contact surface on a support surface of the substrate, e.g. by means of n glue. The PIC may be electrically contacted by using wirebonding or by using flip-chip assembly and a ball grid array (BGA). If a BGA and flip-chip assembly is used for electrically contacting the PIC, no additional means for mechanically mounting the PIC on a substrate is required. An integrated optical waveguide structure defining at least two waveguide end faces is provided at an edge surface of the PIC, which is perpendicular to its contact surface. The electro-optical assembly further comprises an optical coupling device which is also mounted, with a contact surface thereof, on the support surface of the substrate. According to the invention, this optical coupling device is configured to optically connect at least two optical fibers to the photonic integrated circuit.

For this purpose, the optical coupling device comprises an optical waveguide structure defining at least two front waveguide end faces provided at a front edge surface of the optical coupling device, which is perpendicular to its contact surface, wherein the number of these front waveguide end faces corresponds to the number of the waveguide end faces of the optical waveguide structure of the photonic integrated circuit. In this way, the PIC is optically connected to the optical coupling device at least two optical connections, wherein each of the optical connections is defined by a pair of end faces comprising an end face of the PIC waveguide structure and a front waveguide end face of the optical waveguide structure of the optical coupling device.

According to the invention, the optical coupling device is configured to be positionable during an active positioning process in order to optimally align the optical connections between the PIC and the optical coupling device and to be fixated on the substrate in an aligned position.

Generally, the PIC will be mounted to the substrate in a first step. In a next step, the optical coupling device is actively positioned (in up to six axes or degrees of freedom, respectively) with respect to the PIC and fixated to the substrate in an optimally aligned position. Fixating the optical coupling device to the substrate may, for example, be carried out by using a glue, e.g. an epoxy resin. The glue may be applied, especially to the bottom and/or the sides of the optical coupling device, before performing the optical alignment. After having achieved the optimum position, the optical coupling device may be kept in this position until the glue has fully (or sufficiently) hardened.

It is of course also possible to supply glue material between the opposing end faces of the optical connections in order to avoid a free space optical path. In this case, the glue material must be transparent, at least in its hardened condition. It is further desirable that the glue has the effect of an immersion medium, i.e. the reflective index of the glue should be sufficiently close to the reflective index of the material of the integrated optical waveguides and the optical fibers, respectively.

In its simplest configuration, the optical coupling device can be realized as an optical multi-fiber connector (e.g. of an optical multi-fiber pigtail). The optical coupling device may in this case comprise a body in which the optical fiber ends are held in a fixed position with respect to each other. For example, the body may consist of two plate-like halves, wherein in one or both opposing sides of the halves a respective number of V-grooves is provided, the preferably bare fiber ends being fixated by clamping or gluing the two halves together. That is, in this simple embodiment, the optical waveguide structure of the optical coupling device is realized by the optical fibers.

However, the disadvantage of this simple configuration is that no mode field or spot size conversion can be achieved outside the PIC. Nevertheless, also this simple construction can be used for performing the simple alignment process described below. As compared to known designs comprising connecting means, for example grooves, on the PIC for connecting optical fibers, also this simple alternative has the advantage that the optical fibers do not have to be fixated to the sensitive PIC.

As, according to the invention, the optical connection between the PIC and the optical coupling device is actively aligned, the fixation of the optical coupling device is generally performed in such a way that a permanent mechanical and optical connection is achieved in order to avoid any deterioration of the optical connection due to mechanical and thermal influences.

According to a preferred embodiment of the invention, the optical waveguide structure of the optical coupling device comprises at least two rear waveguide end faces which are provided at a connecting portion of the optical coupling device, the at least two rear waveguide end faces and the connecting portion being configured to optically connect at least two optical fibers to the optical waveguide structure, the optical waveguide structure of the optical coupling device being configured to realize a mode field converter functionality in such a way that the mode field at each of the at least two rear waveguide end faces essentially equals the mode field of the respective one of the at least one optical fibers to be coupled thereto and that the mode field at each of the at least two front waveguide end faces essentially equals the mode field of the waveguide structure of the photonic integrated chip at the waveguide end face to be coupled thereto.

In this embodiment, the optical waveguide structure of the optical coupling device comprising the front and rear waveguide interfaces may especially be realized as integrated waveguide structures.

The connecting portion may be provided at an inner portion of the optical coupling device and means for fixating the optical fibers, e.g. grooves, may be provided in the optical coupling device. As explained above, the optical fibers may be fixated using a glue or by mechanical means, e.g. a plate which is configured to press the optical fiber into the groove. Due to the spot size or mode field conversion functionality of the waveguide structure of the optical coupling device, simple passive connection means may be used to optically and mechanically couple the optical fibers to the optical waveguide structure at their rear waveguide end faces, as even standard single-mode optical fibers have a spot size in the region of 8.5 to 10.5 µm.

This embodiment has the advantage that only the coupling device must be changed, especially with respect to the spot size conversion functionality, if different types of fibers shall be coupled to the PIC. No change of the PIC design is necessary, which generally is a more complex and therefore time and money-consuming task.

According to a further embodiment, the optical waveguide structure of the optical coupling device comprises one or more optical splitters. In this way, it is possible to combine or split optical signals on their way from the optical coupling device to the PIC or vice versa.

In another embodiment of the invention, all of the at least two rear waveguide end faces of the optical coupling device are provided at a rear edge surface thereof, which is perpendicular to its contact surface and realizes the connecting portion, and the optical coupling device is configured to be connected to an external optical multi-fiber connector comprising a corresponding number of optical fibers to be connected to the at least two rear end faces. The multi-fiber connector may either be detachably or permanently connected to the optical coupling device. In case of a permanent connection, also an active alignment may be carried out, if required in order to achieve a minimum optical attenuation at the respective fiber to (integrated) optical waveguide connections.

In case of a detachable connection, e.g. a multi-fiber push-on (MPO) connector, the electro-optical assembly may comprise connector means which are configured to mechanically connect an external optical connector to the electro-optical assembly and to optically connect the optical fibers to the optical coupling device.

The connector means may comprise a socket adapted to align the external optical connector with respect to the connecting portion of the optical coupling device and to keep the external optical connector in its aligned position.

The optical coupling device may comprise a bottom part and an upper part which are connected to each other at surfaces parallel to the contact surface defined by the bottom part, wherein the (integrated) optical waveguide structure is comprised by the bottom part or the upper part at a surface region of the opposing surfaces.

The optical coupling device may comprise one or more alignment rods, which are fixated in a respective groove provided in the bottom part and/or the upper part of the optical coupling device, wherein the one or more alignment rods protrude beyond the rear edge surface of the optical coupling device in a direction perpendicular to the rear edge surface. The alignment rods are configured to interact with corresponding alignment recesses of an optical multi-fiber connector, e.g. an MPO or MTP connector.

As already mentioned above, according to an embodiment of the invention, the optical waveguide structure of the optical coupling device may comprise at least two optical fibers, each of which is fixated in a groove provided in the optical coupling device, wherein each groove is provided in such a way that the end face of the respective optical fiber is kept in an aligned position with a respective one of the at least two rear waveguide end faces. In such an embodiment, the connecting portion is provided at an inner region of the optical coupling device.

In another embodiment of the invention, the optical waveguide structure of the photonic integrated circuit comprises a loop waveguide that is separate from the remaining integrated optical waveguide structure, and the waveguide structure of the optical coupling device comprises a first and a second separate loop forming waveguide. The loop waveguide of the PIC comprises a first and a second end face and each loop forming waveguide of the optical coupling device comprises a front waveguide end face configured to be connected to the first and second end face of the loop waveguide, respectively. In this way, the optical loop path defined by the first loop forming waveguide, the loop waveguide and the second loop forming waveguide comprises two optical connections which can be used to align the PIC and the optical coupling device relative to each other using an external optical source that is coupled to a rear end of one of the loop forming waveguides and an external optical receiver at a rear end of the other loop forming waveguide.

According to a further embodiment of the invention, the PIC comprises at least a first and a second opto-electrical converter, e.g. a photodiode, which are configured to detect an optical power portion of a respective optical signal that is guided in a respective first and second optical path of the optical waveguide structure of the photonic integrated circuit, wherein each of the optical paths comprises a waveguide end face of the PIC. This allows to provide an optical signal to the at least two optical connections comprising the respective PIC waveguide end face via the waveguide structure of the optical coupling device which comprises the front waveguide end faces that form the at least two optical connections. In this way, the PIC and the optical coupling device can be actively aligned relative to each other by measuring the respective optical power portion using the opto-electrical converters of the PIC. Thus, no external optical detectors or receivers are required.

According to another embodiment of an electro-optical assembly according to the invention, the photonic integrated circuit comprises a coherent optical transceiver. The coherent optical transceiver comprises an optical modulator and an optical receiver. At least one first monitor opto-electrical converter comprised by the optical modulator is configured to receive a first local oscillator signal that is fed to the optical modulator via an optical path of the optical waveguide structure comprising a dedicated waveguide end face thereof, wherein this waveguide end face defines a first local oscillator signal input port of the photonic integrated circuit. This at least one first opto-electrical converter is adapted to detect a power portion of an optical transmit signal that is output by the optical modulator and fed to a dedicated waveguide end face via an optical path of the optical waveguide structure, wherein this waveguide end face defines a transmit signal output port of the photonic integrated circuit. At least one second monitor opto-electrical converter is comprised by an optical receiver of the optical transceiver. This at least one second opto-electrical converter is adapted to detect a power portion of an optical receive signal that is fed to the optical receiver via an optical path of the optical waveguide structure comprising a dedicated waveguide end face thereof. This waveguide end face defines a receive signal input port of the photonic integrated circuit. Further, the optical receiver comprises at least one high-speed opto-electrical converter which is adapted to measure the optical power of a predetermined signal component of the optical receive signal that has been mixed with a second local oscillator signal. This local oscillator signal is fed to the optical receiver via an optical path of the optical waveguide structure comprising a dedicated waveguide end face thereof, wherein this waveguide end face defines a second local oscillator signal input port of the photonic integrated circuit.

As it will be explained below, an electro-optical assembly comprising such a coherent optical transceiver can be manufactured by applying an active alignment process that uses at least two of the opto-electrical converter types provided on the PIC. As explained below, preferably all three (types) of electro-optical converters are used in order to optimize the relative position of the PIC and the optical coupling device.

The method of manufacturing an electro-optical assembly according to the invention generally comprises the following steps: In a first step, the PIC is mounted on the substrate. This might, for example, be done by using a glue and any other known method to electrically connect the electrical contacts of the PIC to other electrical components that are provided on the substrate or to external contacts of the electro-optical assembly which may be provided on the upper surface or bottom surface of the substrate, e.g. in the form of a ball grid array (BGA). In a second step, an active alignment process is carried out for aligning the end faces of the photonic integrated circuit and the front waveguide end faces of the optical coupling device, wherein an optical signal is fed to at least two optical connections each of which is formed by a pair of these end faces to be aligned, wherein the optical coupling device is positioned continuously or stepwise and a power portion of the respective optical signal transmitted over each of the at least two connections is measured and wherein the positioning and measuring is continued until an optimum position is reached, the optimum position being defined by a predetermined maximum value based on the power portions of the optical signals measured. Finally, the optical coupling device is fixated in its optimum position, e.g. by means of a transparent glue, e.g. an epoxy resin.

As mentioned above, providing an optical coupling device which is configured to connect at least two optical fibers to the PIC and using an active alignment process reduces the manufacturing time and effort while simultaneously ensuring a high-quality coupling between the integrated waveguide structure of the PIC and the optical fibers. As edge couplers are used for the optical connections between the PIC and the optical coupling device, i.e. the optical connections are affected by using opposed waveguide end faces, which are essentially perpendicular to the respective optical axis, a minimum wavelength dependency is achieved. Further, the assembly does not require hermetic sealing as the opposed end faces are in direct contact or a transparent glue fills an axial space therebetween, i.e. no free space optics is used and therefore there is no risk of humidity or condensation in the optical path increasing optical losses.

The method according to the invention for manufacturing an electro-optical assembly comprising a PIC on which at least two opto-electrical converters (which may be of different type, e.g. fast converters, which are configured to convert a data signal, or rather slow or averaging converters, which are configured to perform monitoring tasks, e.g. measuring the average power of an optical signal) are provided, comprises the further or more specific steps of feeding a first and a second optical signal to a dedicated one of the rear waveguide end faces of the optical coupling device that are optically connected to those front waveguide end faces of the optical coupling device which are to be aligned with the waveguide end faces of the photonic integrated circuit of the optical paths that are monitored by the first and second opto-electrical converter, and creating electrical signals by the first and second opto-electrical converters which can be used to optimize the position of the optical coupling device with respect to the PIC. Here, no external opto-electrical converters are required for the active alignment process.

In this embodiment, if a coherent optical transceiver is comprised by the PIC, the first optical signal may be a local oscillator signal that is fed to an optical modulator of a coherent optical transceiver, wherein the optical modulator is controlled to create an optical transmit signal which can be measured by using a respective monitor opto-electrical converter. The second optical signal may be a receive signal which can be measured by a monitor opto-electrical converter comprised by the coherent receiver. However, this embodiment of the method according to the invention may also be realized by using any other type of a PIC that comprises at least two opto-electrical converters.

The method according to the invention for manufacturing an electro-optical assembly comprising a PIC with a coherent optical transceiver according to claim 12 comprises the further or more specific steps of (a) controlling the optical modulator to create an optical transmit signal using a first local oscillator signal that is fed, via the optical waveguide structure of the optical coupling device, to the first local oscillator signal input port, the optical transmit signal being output at the transmit signal output port, wherein at least a power portion of the optical transmit signal is measured by the at least one first monitor opto-electrical converter and wherein the optical transmit signal which has passed through the optical waveguide structure of the optical coupling device or a power portion thereof is measured, and (b) feeding an optical receive signal to a respective rear waveguide end face of the optical coupling device and, via the optical waveguide structure of the optical coupling device, to the receive signal input port, wherein at least a power portion of the optical receive signal is measured by using the at least one second monitor opto-electrical converter, (c) wherein the measured signal portions or components are used to optimize the position the optical coupling device.

According to an alternative of this embodiment, a second local oscillator signal is fed, via the optical waveguide structure of the optical coupling device, to the second local oscillator signal input port, and the optical receiver is controlled to measure one or more components of the optical receive signal that are created by using the optical receive signal and the second oscillator signal by using the at least one high-speed opto-electrical converter.

In these embodiments of the method according to the invention, the first and second oscillator signals may have different wavelengths and may be fed to respective different rear waveguide end faces of the optical coupling device. That is, the coherent transceiver may be configured to receive and transmit at respective different wavelengths so that it is impossible to use the optical receiver for receiving an optical receive signal that has been created by the optical modulator and looped back via the optical coupling device. Instead, in this embodiment, the optical transmit signal which has passed through the optical waveguide structure of the optical coupling device or a power portion thereof is measured by using an external monitor opto-electrical converter of an external receiver.

Alternatively, the first and second local oscillator signals may have identical wavelengths, so that the optical transmit signal that is output at a respective rear waveguide end face of the optical coupling device can be fed, via an optical fiber loop, to another rear waveguide end face that is optically connected to a front waveguide end face of the optical coupling device which is to be connected to the receive signal input port of the photonic integrated circuit. Thus, the optical transmit signal created by the optical modulator forms the optical receive signal, which can be measured by the at least one second opto-electrical converter and/or received by the coherent receiver and thus be measured by using the at least one high-speed opto-electrical converter.

According to a variant of this embodiment, a single local oscillator signal is fed to a rear waveguide surface of the optical coupling device and the optical waveguide structure of the optical coupling device comprises an optical 1×2 splitter, preferably a polarization maintaining optical 1×2 splitter, which is configured to split the local oscillator signal and to feed a first and a second power portion thereof, as the first and second local oscillator signal, respectively, to the respective front waveguide end faces.

In another embodiment of the method according to the invention for manufacturing an electro-optical assembly that comprises the features of claim 10, an external optical positioning signal is fed to a rear end of the first loop forming waveguide, wherein the external optical positioning signal is transmitted to a rear end face of the second loop forming waveguide via the first loop forming waveguide, the front waveguide end face of the first loop forming waveguide which is to be coupled to the first end face of the loop waveguide, the loop waveguide, the second end face of the loop waveguide which is to be coupled to the front waveguide end face of the second loop forming waveguide, and the second loop forming waveguide. In this way, the optical positioning signal received at the rear end of the second loop forming waveguide can be measured by using an external opto-electrical converter.

Thus, even though an external optical source and an external optical receiver comprising an opto-electrical converter are required in order to realize this method, all other advantages achieved by using an optical coupling device that is separate from the PIC and actively aligned relative to the PIC also apply to this embodiment.

These and other features and objects of the present invention will become more fully apparent from the following description of specific embodiments thereof which are illustrated in the drawings. It is appreciated that these drawings depict only typical embodiments of the invention and are therefore not to be considered limiting of its scope. The invention will be described and explained with additional specificity and detail through the use of the accompanying drawings in which:

FIG. 5a shows a schematic perspective view of the main components of an embodiment an electro-optical assembly according to the present invention;

FIG. 5b shows a perspective exploded view of the coupling device of this embodiment comprising connecting means forming a socket for an MPO connector.

Figure 1:
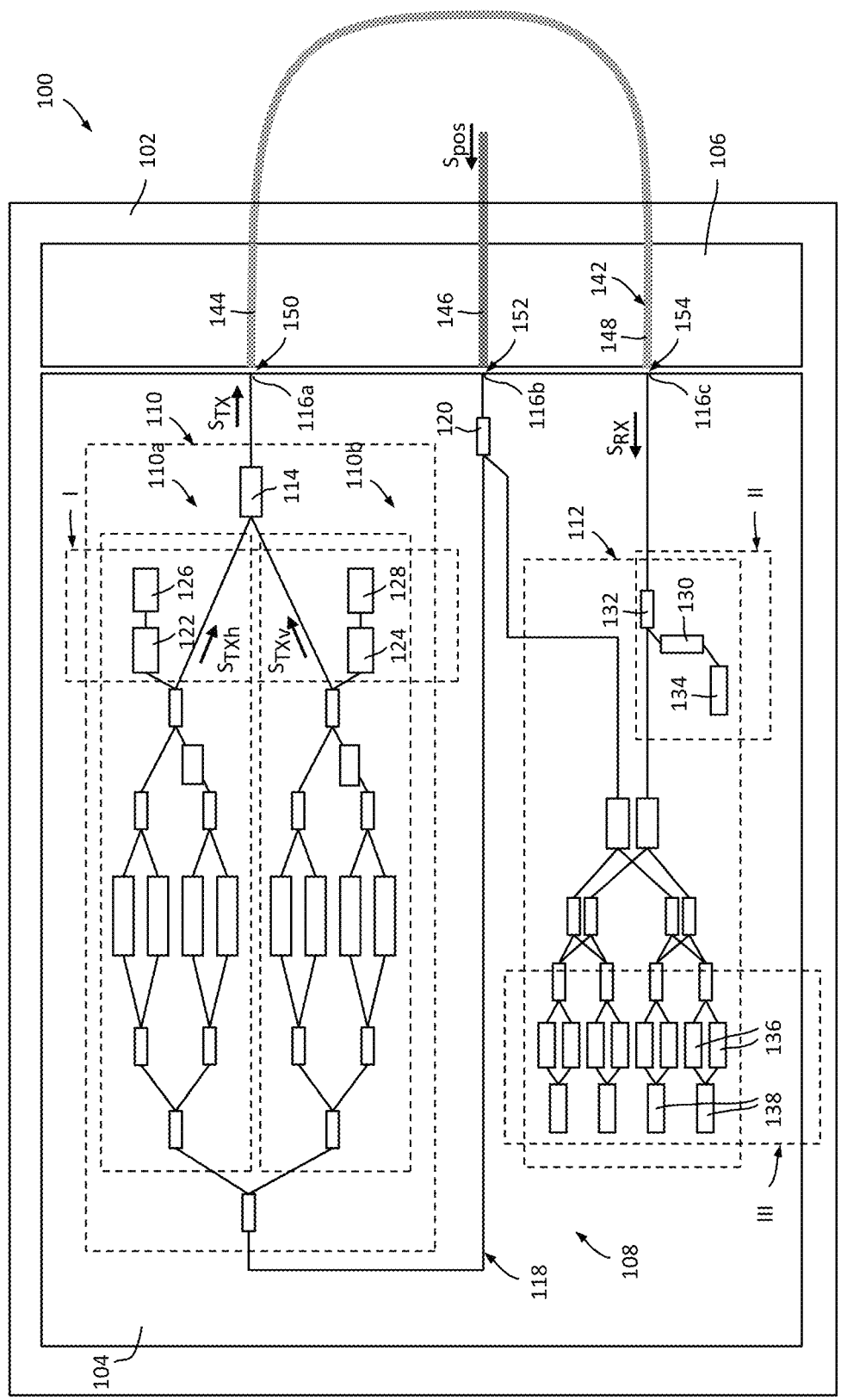
FIG. 1 shows a schematic diagram of an electro-optical assembly according to the invention comprising a PIC, which includes the main components of an optical coherent transceiver, and a coupling device comprising only optical fibers as an optical waveguide structure, wherein the transmit port of the PIC is connected to its receive port via a fiber loop formed by the optical coupling device.

FIG. 1 shows a schematic diagram of an electro-optical assembly 100 comprising a substrate 102, a PIC 104 and an optical coupling device 106. The PIC 104 is mounted with a contact surface, e.g. the bottom surface, on a support surface of the substrate, which may have a plate-like structure and consist of a temperature-stable material, e.g. a ceramic material. As shown in FIG. 1, the electro-optical assembly 100 may comprise a coherent optical transceiver 108, wherein at least certain components thereof, especially optical components, opto-electric converters and certain merely electronic components, e.g. amplifiers, are provided on the PIC 104. As apparent from FIG. 1, the PIC 104 comprises an optical modulator 110 of an optical transmitter of the coherent transceiver 108 and certain components of an optical receiver part 112 of the coherent transceiver 108. Of course, the optical transceiver 108 comprises a controller (not shown) for controlling the functionality of the optical transmitter, including the optical modulator 108, and the optical receiver, including the receiver part 112. The controller may comprise a single unit or one or more distributed units, which may be provided on the substrate 102. The substrate 102 may comprise the electrical wiring for connecting the controller or controller components and the electrical or opto-electrical components provided on the PIC 104. The controller is especially configured to receive and process electrical signals created by opto-electrical converters, as the case may be, amplified by appropriate electrical amplifiers, and to create electrical signals that are supplied to the optical modulator and/or to electrical drivers that are provided in order to create driver signals for the optical modulator 110 or the optical receiver.

As shown in FIG. 1, the optical modulator 110 comprises two modulator parts 110a and 110b, each of which is adapted to create a partial optical transmit signal for a selected one of two orthogonal polarization directions, i.e. a partial optical transmit signal for the horizontal polarization $S_{TXh}$ and a partial optical transmit signal for the vertical polarization $S_{TXv}$. These partial optical transmit signals are combined by a polarization maintaining 2×1 optical combiner 114. A common port of the optical combiner 114 is connected to a transmit signal output port 116a of the PIC 104 by a waveguide portion of an integrated optical waveguide structure 118, which comprises all optical waveguides provided on the PIC 104, including the waveguides that form part of the optical modulator 110 or the optical receiver part 112.

The PIC further comprises a local oscillator signal input port 116b and a receive signal input port 116c. The local oscillator signal input port 116b is configured to receive an optical local oscillator signal that may be created by a narrow-bandwidth laser source (not shown) provided on the PIC 104 or supplied from an external laser source (not shown). The local oscillator signal input port 116b is defined by an end face of a waveguide portion of the integrated optical waveguide structure 118, which is connected to a common port of an optical 1×2 splitter 120. A first splitting port of the splitter 120 is connected to a respective local oscillator signal input port of the optical modulator 110 and a second splitting port of the optical splitter 120 is connected to a respective local oscillator signal input port of the receiver part 112. The receive signal input port 116c is defined by a respective end face of a waveguide portion that is connected with the optical receiver part 112. The receive signal input port 116c is connected to a receive signal input port of the optical receiver part 112.

In the embodiment shown in FIG. 1, all signal ports 116a, 116b, 116c are provided at an edge of the PIC 104 in such a way that the end faces of the respective waveguides or waveguide portions are perpendicular to the optical axes thereof and are flush with the sidewall of the PIC 104.

Each of the modulator parts 110a and 110b of the optical modulator 110 comprises a monitor opto-electrical converter 122, 124, e.g. a monitor diode, which is configured to monitor the optical power of a respective partial transmit signal output by the respective modulator part 110a, 110b, respectively. For this purpose, each of the modulator parts 110a, 110b may comprise a respective optical splitter which taps off a small portion of the optical power of the respective optical output signal and feeds this tapped-off portion to the respective monitor diode 122, 124. Each of the respective monitor diodes 122, 124 creates a respective electrical monitoring signal which is fed to an electrical amplifier 126, 128, e.g a transimpedance amplifier.

In this way, the (average) optical power of each of the partial output signals and thus the optical power of the (full) optical transmit signal $S_{TX}$ created by the optical modulator 110 can be measured and thus monitored.

The optical receive signal that is received at the receive signal input port 116c can also be measured and thus monitored by means of a further monitor opto-electrical converter 130, e.g. a monitor diode, which is connected to a first splitting port of an optical 1×2 splitter 132 and provided in the optical waveguide portion between the receive signal input port 116c and the receive signal input port of the receiver part 112. Of course, a second splitting port of the 1×2 splitter 132 is connected to the receive signal input port of the receiver part 112. An electrical output signal of the monitor diode 130 is supplied to a further electrical amplifier 134, e.g. a transimpedance amplifier. All electrical signals output by the electrical amplifiers 126, 128 and 134 may be supplied to the controller of the electro-optical assembly 100.

As known in the art, the receiver part 112 of the coherent optical transceiver 108 may comprise four fast opto-electrical converters 136, e.g. photodiodes, for detecting respective optical signal components for each polarization direction. That is, eight fast photodiodes 136 are provided in order to receive the optical receive signal. Usually, two of the respective electrical signals can be supplied to an electrical amplifier 138, e.g. a transimpedance amplifier, which is configured to output an electrical signal corresponding to the difference or sum of the respective electrical input signals.

The optical coupling device 106 of the embodiment shown in FIG. 1 comprises a body part 140, wherein an optical waveguide structure 142 is provided on a surface thereof or integrated therein. The optical waveguide structure 142 may be realized by three pieces of optical fibers 144, 146, 148. However, any type of waveguides or waveguide structure may be used, e.g. an integrated waveguide structure comprising respective waveguide portions. The optical fiber piece or waveguide structure portion 146 may be a piece of a polarization-maintaining fiber appropriate to feed the local oscillator signal to the PIC. The fiber pieces or waveguide structure portions 144, 146, 148 have respective front waveguide end faces, which are provided flush with a front edge wall of the body part 140 of the optical coupling device 106. The body part may have a plate-like configuration and consist of a mechanically and thermally sufficiently stable material, e.g. silicon or ceramics. In order to avoid different thermal behaviour of the PIC 104 and the optical coupling device 106, the base body 140 of the optical coupling device 106 may consist of the same material as the substrate of the PIC (that supports or into which it is integrated the PIC waveguide structure 118).

According to the embodiment shown in FIG. 1, the optical coupling device 106 may be an end part of a fiber pigtail, wherein the respective fiber ends are directly fixated within the body part 140. For example, the bare fiber ends may be inserted into grooves provided in the body part 140 or a part thereof. The end faces of the bare fiber ends may be cut or polished (as the case may be, together with the front edge wall of the body part) so that the fiber end faces are flush with the front edge wall. It would, of course, also be possible that the fiber end faces extend to a small extent over the front edge wall of the body part 140.

The positions of the optical axes of the waveguide structure portions (at least of a part thereof neighboring the respective end face) are arranged in such a way that they can be aligned (apart from manufacturing tolerances) with the optical axes of the waveguide portions of the PIC waveguide structure 118 at the respective ports of the PIC 104.

As the waveguide structure 142 of the optical coupling device 106 is comprised by a single part, namely, the body part 142, only a single active alignment process must be carried out in order to optically couple and optimize all optical connections that are formed by a respective pair of a front waveguide end face of the optical coupling device 106 and a dedicated end face of the PIC waveguide structure 118.

Generally, in order to carry out an active alignment process for aligning the end faces of the photonic integrated circuit and the front waveguide end faces of the optical coupling device, an optical positioning signal $S_{pos}$ (which includes the use of two separate or independent optical positioning signals) must be transmitted over at least two of the optical connections. After the PIC 104 has been mounted on the substrate 102, e.g. by using an appropriate glue and, as the case may be, any known method for connecting the electrical contacts provided on the PIC to electrical contacts of other electrical or electronical components provided on the substrate 102 or external contacts of the substrate 102 (e.g. BGA contacts), the optical coupling device 106 is positioned continuously or stepwise by means of a known positioning device (not shown), e.g. a six axis positioning devise, wherein the optical power of the respective positioning signal that is transmitted over the at least two optical connections is measured by an opto-electrical converter, e.g. a photodiode. The electrical signal created by the opto-electrical converters is fed to a position controller (not shown) of the positioning device so that these signals can be used in order to control actors of the positioning device in such a way that the at least two optical connections are optimized, i.e. the optical axis of each waveguide end portion of the waveguide structure of the PIC 104 at the respective waveguide end face is aligned with the optical axis of each waveguide front end portion of the waveguide structure of the optical coupling device 106 at the corresponding front waveguide end face. If a perfect alignment cannot be reached due to manufacturing tolerances with respect to the geometrical position of the end faces of the PIC and the front waveguide end faces of the optical coupling device 106, an optimum position of the optical coupling device may be defined as a position in which the average attenuation of the at least two optical connections reaches its minimum. This is the case when the sum of the measured electrical signals created by the respective photodiodes reaches its maximum.

It is, of course, possible to measure only a power portion of the optical positioning signal that is tapped off from the main path downstream of the respective optical connection instead of measuring the optical power of the full optical positioning signal that is guided in the main path at a position downstream of the respective connection.

In case of the embodiment shown in FIG. 1, such an active alignment process can be carried out by using a single external optical positioning signal $S_{pos}$, which is fed to a rear end of the piece of optical fiber 146, i.e. the optical positioning signal $S_{pos}$ is fed to the local oscillator signal input port 116b of the PIC 104 via the respective front waveguide end face of the optical fiber 146. The optical positioning signal $S_{pos}$ may be created by using an external laser (not shown) that is connected to the optical fiber 146. The optical positioning signal $S_{pos}$ may be a CW signal.

It shall be noted at this point that in this description, as far as it is referred to an active align process, an optical local oscillator signal, which is formed by an external positional signal that is fed to a local oscillator signal input port of the PIC 104 (vial the optical coupling device 106), may also be referred to as optical positioning signal $S_{pos}$. An optical transmit signal $S_{TX}$, which is created using an external optical positioning signal $S_{pos}$ and output at the transmit signal output port 116a of the PIC 104, may also be referred to as optical positioning signal $S_{pos}$. Similarly, an optical receive signal $S_{RX}$, which is fed to the receive signal input port 116c of the PIC 104 may be referred to as optical positioning signal $S_{pos}$ if it formed by or has been created using an external optical positioning signal $S_{pos}$.

As the optical positioning signal $S_{pos}$ is split by the 1×2 splitter 120 and a certain power portion of this signal is fed to the received signal input port of the optical receiver part 112, it can be used as a local oscillator signal for receiving an optical receive signal that is fed to the received signal input port 116c of the PIC 104. Further, as a power portion of the optical positioning signal $S_{pos}$ is fed to the local oscillator signal input port of the optical modulator 110, it can be used as a local oscillator signal which is modulated by the optical modulator 110. As the two polarization components are separately modulated by the respective modulator part 110a, 110b, each of the respective partial optical transmit signals, i.e. the respective modulated optical positioning signal $S_{pos}$, can be monitored by the monitor diodes 122 and 124 (and the respective electrical amplifier 126, 128), respectively. That is, the attenuation of the optical connection 150 between the optical fiber 146 and the local oscillator signal input port 116b of the PIC 104 can at least qualitatively be assessed by measuring the optical power of one or both of the partial optical transmit signals $S_{TX, h}$ and $S_{TX, v}$. the respective electrical signals that are output by the respective amplifier 126, 128 can either be directly fed to the (external) position controller or to the controller of the electro-optical assembly, which may be configured to process the respective electrical signals. The processed electrical signals may then be fed to the position controller, which uses this or these signals for a closed-loop positioning control.

It shall be noted that the signals created by the monitor diodes 122, 124 and the amplifiers 126, 128 only depend on the optical properties of the connection 150 (if the properties of the optical modulator 110 are kept constant), i.e. the position of the front end face of the optical fiber 146 and a mismatch of the optical mode fields of the opposed optical waveguides. In case of a standard optical fiber, the mismatch is considerable so that a rather high attenuation is caused by this optical connection even if the optical axes are perfectly aligned and no axial gap is present.

As apparent from FIG. 1, the optical transmit signal $S_{TX}$ that is created by modulating the optical positioning signal $S_{pos}$ is transmitted over the optical connection 152 formed by the front waveguide end face forming the transmit signal output port and the front end face of the optical fiber 144. As the fiber 144 is connected to the fiber 148, the optical transmit signal $S_{TX}$ is also transmitted over the connection 154 formed by the front end face of the fiber 148 and the receive signal input port 116c. That is, the optical transmit signal $S_{TX}$ that is fed, as optical receive signal $S_{RX}$, to the optical receiver part 112 via the optical 1×2 splitter 132 can be received using the optical positioning signal $S_{pos}$ as local oscillator signal. That is, the corresponding components of the optical receive signal $S_{RX}$ of both polarization components can be detected by the fast photodiodes 136 and measured using the four amplifiers 138. The electrical signals created by the amplifiers 138 may be fed to the (external) positioning controller or to the controller of the opto-electrical assembly, which performs a pre-processing and outputs the pre-processed signal to the positioning controller.

Obviously, the signals detected by the fast photodiodes 136 and thus the signal created by the amplifiers 138 depend on the signals transmitted over all three of the optical connections 150, 152 and 152. One or more or all of the signals detected by the photodiodes 136, especially the signal components combined by the amplifiers 138, may be used for assessing the transmission properties of the respective optical connections.

The optical receive signal $S_{RX}$ depends, due to the optical loop formed by the fibers 144 and 148, on the properties of the optical connections 150 and 154, and can be detected by the monitor diode 130. The electrical signal created by the monitor diode 130 is amplified by the amplifier 134 and can be fed directly to the position controller or via the controller of the opto-electrical assembly.

As described above, the position controller may use the signals created by the opto-electrical converters 122 and/or 124 (in the following referred to as signal detection and measurement at detection position I) and the signal created by the opto-electrical converters 130 (in the following referred to as signal detection and measurement at detection position II) in order to perform the positioning of the optical coupling device 106 relative to the PIC 104. Measuring at position I is advantageous as the respective measurement signal (output by one or both of the amplifiers 126, 128) depends on the transmittance of connection 152, only. Thus, the positioning process can easily be carried out, e.g. by coarsely scanning the position of the optical coupling device 106 starting from a given initial start position until a signal is detected. Once a signal has been detected, a fine positioning can be performed using closed-loop control in order to maximize the signal measured at position I. Then, a coarse positioning can be carried out until a signal at position II is measured. This coarse positioning can be carried out in such a way that the position of connection 152 is essentially kept constant, wherein the optical coupling device is moved around the optical axis of the aligned connection 152, only. If a signal is detected by measuring at position II, a fine positioning process in order to maximize the signal at position II can be performed (meaning that the sum of the attenuation of connections 150 and 154 is minimized). Alternatively, a fine positioning process can be carried out in such a way that the sum of both signals measured at positions I and II is maximized (which results in a minimum average attenuation at connections 150, 152 and 154).

It might also be possible to measure at position II, only, in order to align the optical connection 150, 152 and 154. However, it is more difficult and may take more time to carry out the coarse positioning process as all three connections must be coarsely aligned in order to measure a signal at position II that is different from zero.

Additionally or instead of signals measured at positions I or II (especially instead of the signal measured at position II), one or more of the signals of the fast photodiodes 136 or the amplifiers 138 (in the following referred to as signal detection and measurement at detection position III) may be used to carry out the active alignment process. Also, these signals depend on the transmittance of all three connections 150, 152 and 154.

Measuring at position III might be omitted if it can be assured that the optical modulator 110 is in an at least partially transmissive state. In this case, an optical transmit signal $S_{TX}$ is created which can be detected at position II (and, of course, also at position I).

If, however, it cannot guaranteed that the optical modulator 110 is in an at least partially transmissive state, measuring the signal at position III can be used to assess the coupling quality of connection 152. Even if the optical modulator 110 is in a fully blocking state, i.e. no signals $S_{TX}$ and $S_{RX}$ can be detected at positions I and II, signal $S_{pos}$ can be detected and measured at position III, depending on the coupling quality of connection 152.

Thus, if no signal is detected at all three positions I, II, III, connection 152 may be varied in a first step until a signal is detected at position III. In a next step, detecting and measuring the optical transmit signal $S_{TX}$ at position I may be used to vary the state of the optical modulator 110 (while keeping the position of connection 152 constant) until the optical transmit signal $S_{TX}$ is at a maximum or at least exceeds a predetermined signal level. Then, the position of connections 150 and 154 may be varied until signals are measured at positions II or III. Of course, while varying the positions of connections 150 and 154 a sufficient coupling should also be maintained for connection 152.

After a desired optimized position of the optical coupling device 106 with respect to the PIC 104 is reached, the optical coupling device 106 is fixated onto the substrate 102, e.g. by gluing using an epoxy resin. The glue may be appropriately provided, e.g. between the bottom surface of the optical coupling device 106 and the support surface of the substrate 102 before the active alignment process is carried out. The optical coupling device 106 must be held in its desired optimized position until the glue has sufficiently hardened. A fine positioning may even be repeated or continuously carried out during hardening of the glue. Preferably, a transparent glue may be used that has a refraction index identical or sufficiently close to the refraction index of the waveguide structure, wherein the glue material is also provided between the pairs of end faces forming an optical connection between the PIC 104 and the optical coupling device 106.

As already mentioned above, it might be impossible to simultaneously optimize each of the two or more connections between the PC 104 and the optical coupling device (with respect to their optical attenuation) due to manufacturing tolerances. In this case, it is possible to optimize a selected one of the connections independently of the other connections (so that the transmittance of this connection is at a maximum) and to position, while keeping constant the position or maximum transmittance of the initially selected connection, the optical coupling device 104 with respect to the one or more other connections in such a way that either a selected one of these further connections reaches a maximum transmittance (or minimum attenuation) or the average transmittance (or attenuation) of all further connections reaches a maximum (i.e. the average attenuation reaches a minimum).

Due to using opto-electrical converters that are provided on the PIC 104 (for the purpose of its normal usage), a minimum of additional tools is required for carrying out the active alignment process. Through the use of monitor diodes or fast receiver photodiodes on multiple locations on the chip, additional information on the precise nature of a potential misalignment can be retrieved. As a single coupling device 106 is used for coupling two or more fibers to the PIC 104, the alignment process can be carried out in a single step.

Figure 2:
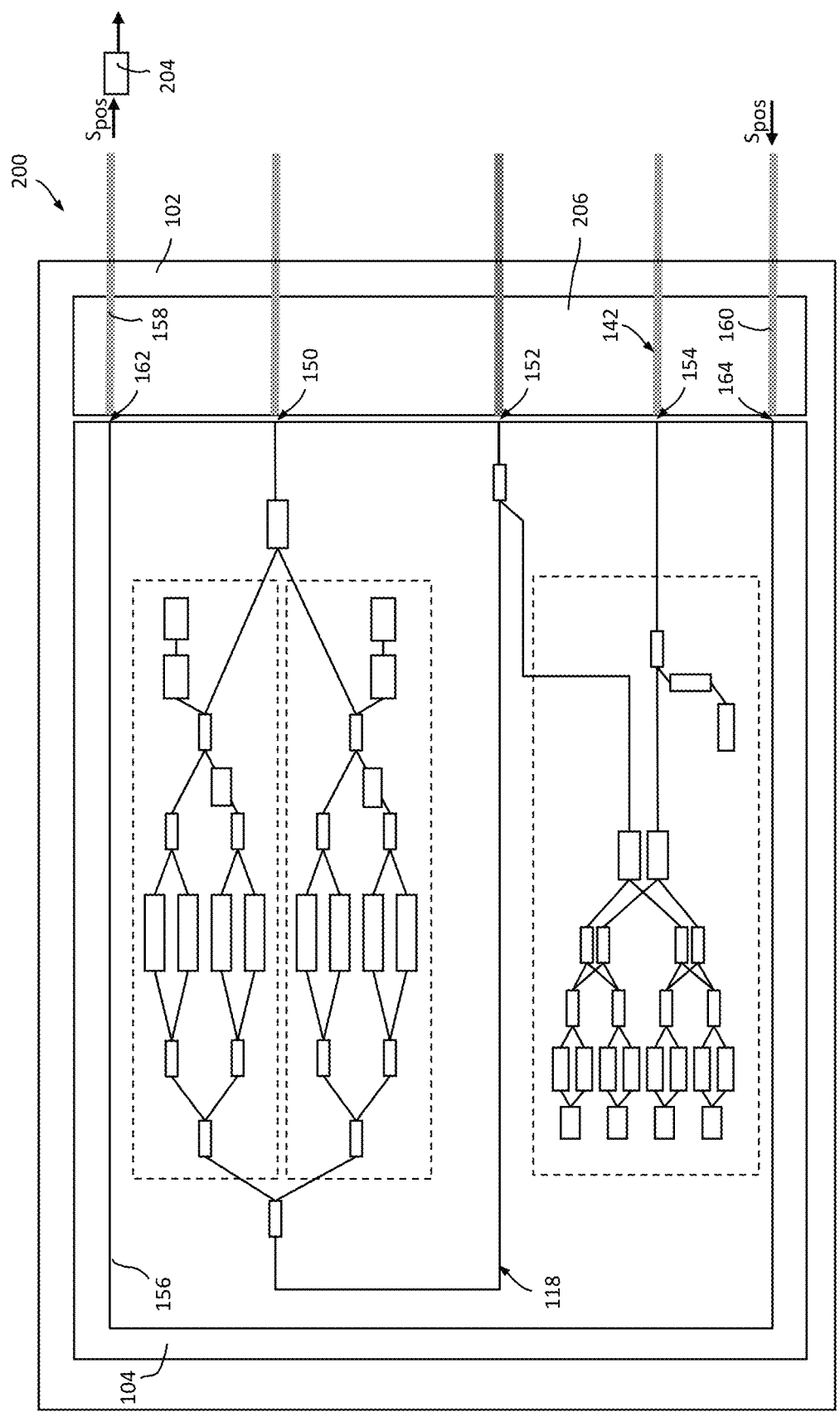
FIG. 2 shows a further embodiment of an electro-optical assembly according to the invention, wherein the optical waveguide structure of the PIC comprises a separate loop, the end faces of which are connected to front waveguide end faces of separate loop forming waveguides comprised by the optical waveguide structure of the optical coupling device.

The embodiment of an opto-electrical assembly 200 shown in FIG. 2 is similar to the embodiment according to FIG. 1. Thus, corresponding components and features are designated with identical reference signs.

In addition to the embodiment according to FIG. 1, the PIC 104 comprises, in addition to the components of the PIC 104 shown in FIG. 1, a loop waveguide 156 comprised by the waveguide structure 118. The loop waveguide 156 is provided separately from all other waveguide portions of the optical waveguide structure 118 and defines corresponding end faces that are flush with the side wall of the respective edge of the PIC 104.

The coupling device 206 according to the embodiment of an opto-electrical assembly 200 shown in FIG. 2 comprises a waveguide structure 142 including additional pieces of optical fibers 158, 160 or additional waveguide structure portions, which may be referred to as loop forming waveguides or loop forming optical fibers, which define corresponding front waveguide interfaces at the front edge of the optical coupling device 106 facing the side wall of the PIC edge at which the end faces of the loop waveguide 156 are provided. The geometrical position of the end faces of the loop waveguide 156 and the end faces of the loop forming optical fibers 158, 160 are configured to establish optical connections 162, 164 if the optical axes of the respective end portions of the waveguide structures 118 and 142 are aligned. That is, the end faces of the loop waveguide 156 and the front end faces of the loop forming optical fibers 158, 160 of the waveguide structure 142 are provided in such a way that the optical connections 150, 152 and 154 are fully aligned (apart from manufacturing tolerances) if the connections 162, 164 are aligned.

Thus, the optical coupling device 106 of the embodiment shown in FIG. 1 can be aligned by simply aligning the respective end faces of the loop waveguide 156 of waveguide structure 118 of the PIC 104 and the end faces of the loop forming optical fibers 158, 160 of the waveguide structure 142 of the optical coupling device 106. For this purpose, an optical positioning signal $S_{pos}$ can be fed to a rear end of one of the loop forming fibers 158, 160, e.g. to the rear end of the loop forming fiber 158, and the optical power portion of the optical positioning signal $S_{pos}$ that has been transmitted via the loop forming fiber 158, the optical connection 162, the loop waveguide 156, the optical connection 164 and the loop forming fiber 160 can be measured by means of an external opto-electrical converter 204, e.g. a photodiode, and a respective amplifier.

Using the additional loop waveguide 156 and the additional loop forming waveguides or optical fibers 158, 160 for the active alignment process has the advantage that the electrical and opto-electrical components of the PIC 104 do not have to be electrically contacted. However, an additional external optical receiver device, comprising an external opto-electrical converter 204 and an external electrical amplifier, is required. Further, manufacturing tolerances regarding the exact geometrical positions of the optical axes of the waveguide portions defining the pairs of end faces forming the optical connections may negatively influence the transmittance of the optical connections 150, 152, 154 that can be achieved by optimally aligning the optical connections 162, 164 in the positioning loop formed by the loop waveguide 156 and the loop forming waveguides or fibers 158, 160. However, a single active alignment process is sufficient for connecting two or more fibers to the PIC 104 due to the use of an optical coupling device 106 which is configured to hold the fibers in a predefined position.

The optical fibers 158, 160 may be clipped off after having fixated the optical coupling device 106 to the substrate 102 as the loop consisting of the loop waveguide 156 and the loop forming waveguides or optical fibers 158, 160 only serves for carrying out the alignment.

Figure 3:
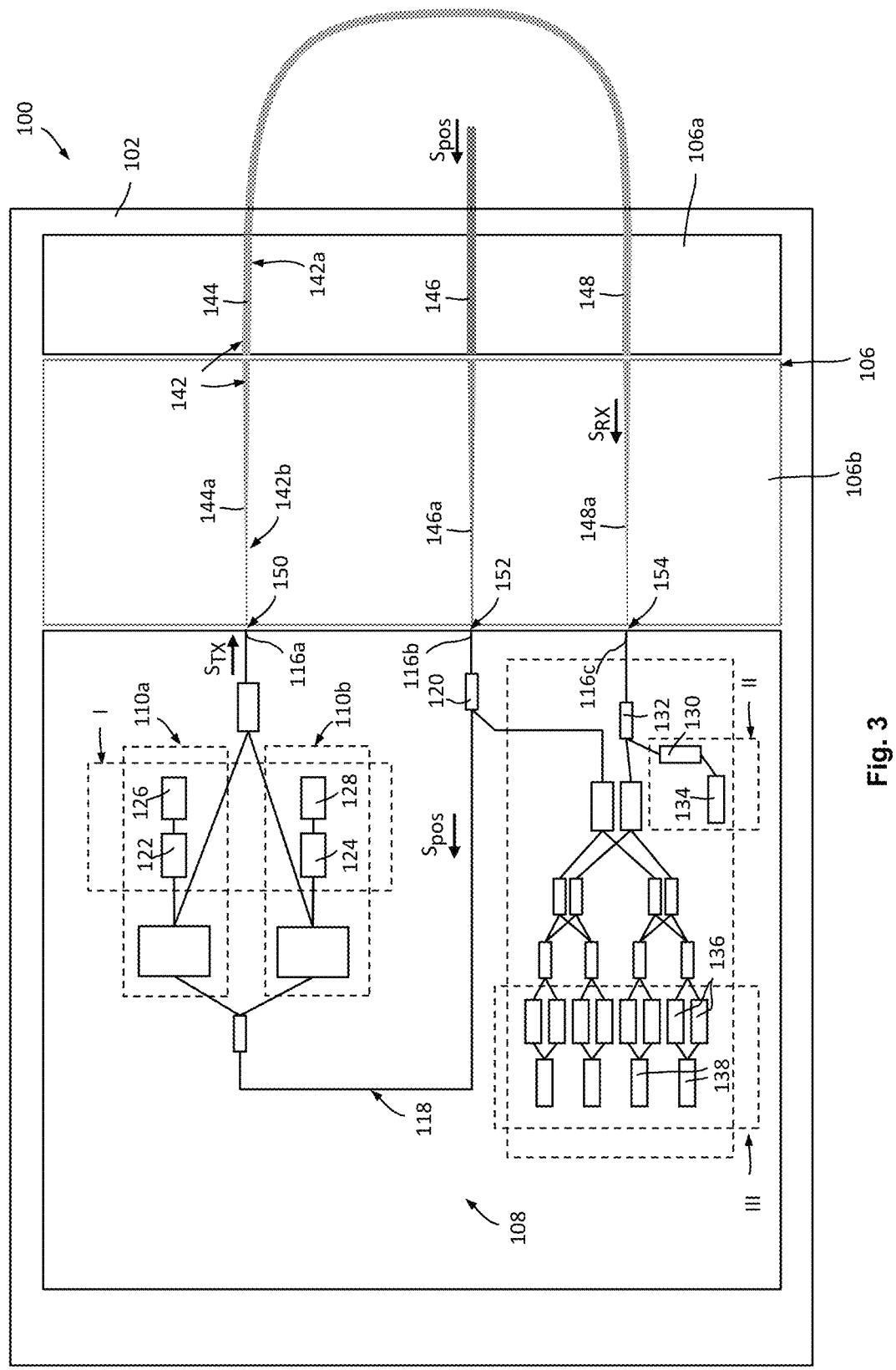
FIG. 3 shows another embodiment similar to the embodiment in FIG. 1, wherein the optical coupling device comprises a first part revealing the functionality of a spot size converter and a second part for connecting optical fibers to the first part.

FIG. 3 shows an embodiment very similar, also with respect to possible active positioning processes, to the embodiment in FIG. 1. The decisive difference is the alternative design of the optical coupling device 106, which comprises two parts 106a and 106b. The part 106a corresponds to the design of the optical coupling device 106 according to FIG. 1, i.e. the optical waveguide structure portion 142a of the waveguide structure 142 comprised by the part 106a comprises the optical fibers 144, 146 and 148. The part 106a is mechanically and optically connected to the further part 106b, which comprises a further portion 142b of the waveguide structure 142, which serves as a spot size converter (SSC). In the embodiment shown in FIG. 3, the waveguide structure portion 142b includes three integrated waveguides 144a, 146a, 148a which realize a spot size conversion functionality, i.e. which transform the mode field of the waveguide structure 118 of the PIC 104 at the respective end faces (or ports) into the mode field of the optical fibers 144, 146, 148. This helps to reduce the attenuation at the interface between the PIC 104 and the optical coupling device 106. As apparent from FIG. 3, at least a front portion of the integrated waveguides 144a, 146a, 148a, e.g. the front portion neighboring the interface to part 106b comprising the waveguide structure portion 142b, may be a tapered portion realizing the spot size conversion functionality.

The part 106a may be optically and mechanically connected to the part 106b before the whole optical coupling device 106 is mounted to the substrate 102 as described above. Connecting parts 106a and 106b may be realized by using a passive alignment process as the spot sizes of the optical fibers 144, 146 and 148 are essentially identical or in the same range (e.g. within a tolerance range of plus or minus 5 to 10 percent relative to the spot size of the optical fibers), wherein the absolute range of the spot size of a standard optical fiber (whether or not having polarization maintaining or other specific properties, like dispersion-shifted or bend-insensitive fibers) is approximately 8 to 10.5 µm. Thus, a passive alignment using mechanical aids may be sufficient in order to realize an acceptably low attenuation at the optical fiber-waveguide connections at the interface between parts 106a and 106b. Appropriate passive alignment aids may be provided at one or both of the parts 106a, 106b, e.g. alignment rods that interact with corresponding bores or holes (not shown). Fixating the passively aligned position may be achieved by using a glue.

It is, of course, also possible to use an active alignment process for optically and mechanically connecting the parts 106a and 106b. A mechanical connection may be achieved by using an epoxy resin or any other glue irrespective of an active or passive alignment process has been applied. As described above for the connection between the PIC 104 and the optical coupling device 106, a glue simultaneously acting as an immersion medium may be used between the end faces of the optical fibers 144, 146, 148 and the respective end faces of the integrated waveguides 144a, 146a, 148a.

It is also possible to manufacture the parts 106a and 106b as a single part so that the respective optical coupling device 106 comprises, as an integrated part, the optical waveguide portions 142a and 142b of the optical waveguide structure 142, i.e. the integrated waveguides 144a, 146a, 148a as well as the optical fibers 144, 146, 148. The optical fibers 144, 146, 148 may be fixated in grooves provided in the rear portion of the single integrated part, e.g. by means of a glue (in the same manner as explained above), i.e. a passive alignment process is used by simply inserting the respective fiber end in the respective groove which positions the fiber in the plane perpendicular to the optical axis of the fiber (and the respective integrated waveguide).

Further, the part 106a that comprises the optical fibers 144, 146, 148 may be realized in the form of a detachable multi-fiber connector (e.g. a multi-fiber push-on (MPO) connector), i.e. the optical coupling device as such merely comprises the part 106b that includes the optical waveguide portion 142b featuring the spot size conversion functionality. Due to the spot size conversion from small spot sizes on the PIC 104 to large spot sizes through the optical coupling device 106 (i.e. the part 106b in this case), a passive alignment process between the waveguide structure portion 142b and the optical fibers to be coupled thereto may be used.

Thus, even if an optical coupling device 106 that functions as a spot size converter is used, only a single active alignment process is required (namely, between the PIC 104 and the optical coupling device 106). As only edge couplers are used for optically connecting optical fibers to the PIC waveguide structure, the wavelength dependency of the optical connections is low (in the interesting wavelength range for optical communication) so that the combination of the PIC 104 and the optical coupling device is appropriate for broadband applications (especially WDM applications) and applications using tunable narrowband optical signals.

Using integrated opto-electrical converters and other electrical components on the PIC 104 that are necessary to detect and measure the (average) optical power of positioning signals facilitates the active alignment process and minimizes the amount of tools (external lasers or photo detectors) required for the assembly of the electro-optical assembly 100 and/or the number of alignment steps to be conducted and therefore contributes to lowering the assembly costs. In addition, no free space optics are used as all parts, i.e. the PIC 104, the optical coupling device 106 (or the parts 106a and 106b thereof) and the optical fibers 144, 146, 148 are directly coupled to each other, especially by using a transparent glue also in a potential axial gap between respective end faces.

Figure 4:
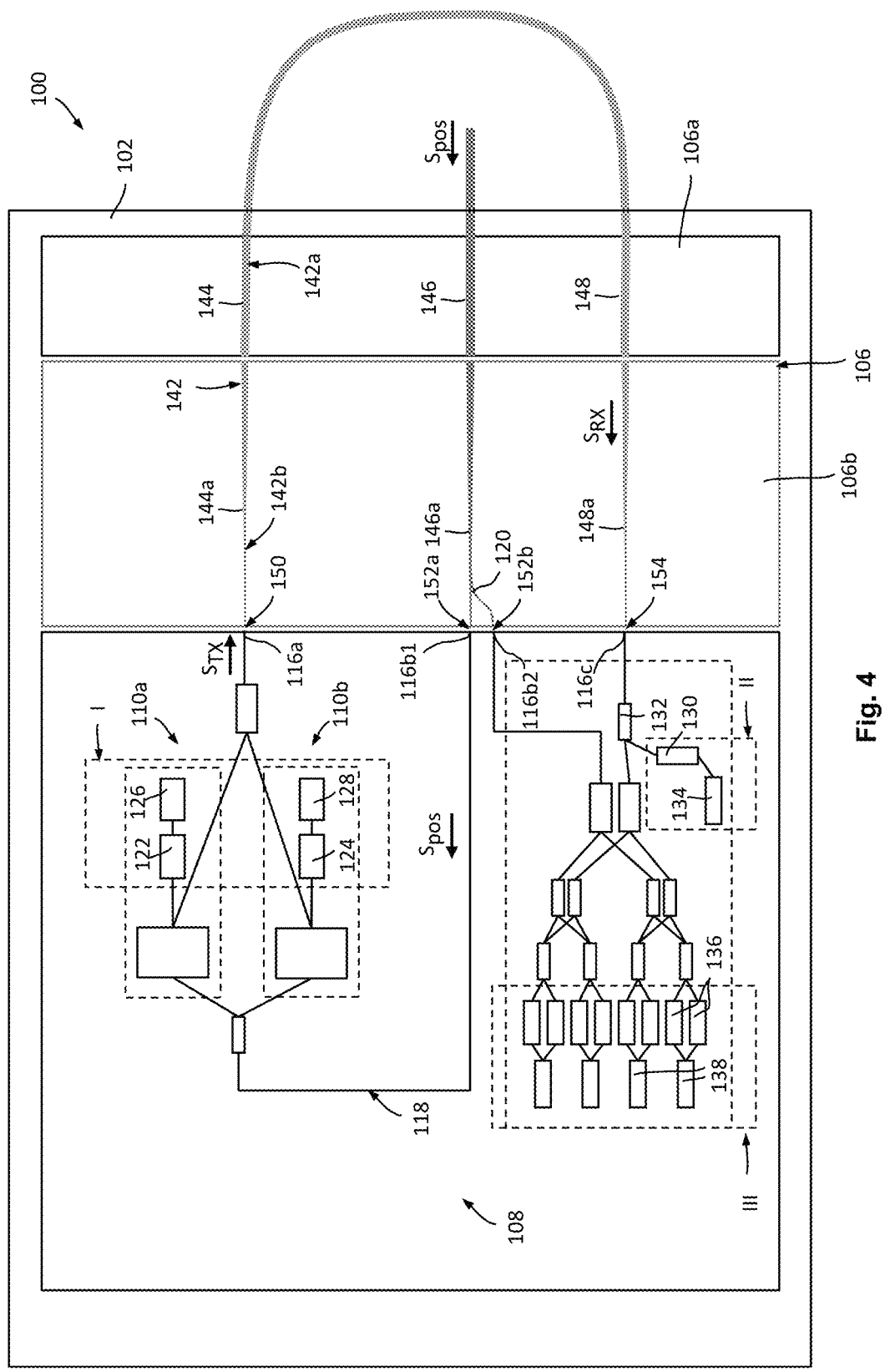
FIG. 4 shows another embodiment similar to the embodiment in FIG. 3, wherein the optical coupling device comprises a beam splitter on its first part.

This also applies to the embodiment shown in FIG. 4, which is essentially identical with the embodiment in FIG. 3, apart from the position of the optical 1×2 splitter 120. In the embodiment according to FIG. 4, the optical 1×2 splitter 120 is provided in the optical waveguide structure portion 142b of part 106b of the optical coupling device 106. This embodiment illustrates that the waveguide structure 142, especially the optical waveguide structure portion 142b, of the optical coupling device may not only comprise simple straight waveguides, but also additional optical components like splitters, combiners, multiplexers and demultiplexers, circulators etc. This makes it possible to use standardized PICs 104, e.g. optical transceivers, and to realize application-specific functions by coupling an appropriate optical coupling device 106 to the PIC.

Of course, due to providing the optical 1×2 splitter 120 on the optical coupling device 106, instead of a single optical connection 152 and a single local oscillator signal input port 116b, two optical connections 152a, 152b realizing two local oscillator signal input ports 116b1, 116b2 exist. The local oscillator signal input port 116b1 is connected to the input port of the optical modulator 110 and the local oscillator signal input port 116b2 is connected to the optical receiver part 112. This PIC 104 can thus be used for creating an optical transmit signal $S_{TX}$ at a first wavelength and receiving an optical receive signal $S_{RX}$ at a different second wavelength. Of course, with an optical coupling device having an optical waveguide structure as shown in FIG. 4, the electro-optical assembly 100 is capable of creating an optical transmit signal $S_{TX}$ and receiving an optical receive signal $S_{RX}$ having essentially the same wavelength as only a single local oscillator signal is used that is split by the splitter 120 and supplied to both local oscillator signal input ports 116b1 and 116b2. However, by just modifying the optical coupling device (which can be done at rather low costs due to its simple structure), the same PIC 104 can be used for an electro-optical assembly that receives two local oscillator signals having different wavelengths. An appropriate optical coupling device 106 comprises instead of a single integrated waveguide for a single local oscillator signal (during normal operation of the electro-optical assembly) two corresponding integrated waveguides, each of which may be coupled to a respective optical fiber.

The active alignment process for the embodiments shown in FIGS. 3 and 4 can be performed as previously described in connection with the embodiment according to FIG. 1.

Generally, for realizing the optical coupling device, apart from using optical fibers that are fixated in a body part 140, any technology for creating an integrated waveguide structure, whether simple straight waveguides or more complicated components, like spot-size converters, splitters etc., may be used. For example, an optical coupling device may consist of a glass or ceramic material substrate, in which implanted waveguides are provided. Spot-size converters may be realized as tapered waveguides in such a way that they adiabatically convert a small spot-size matched to the integrated waveguide mode on the PIC side to a large spot size on the other side matched to a fiber mode (especially the fundamental modes of a single-mode fiber). The thermal properties of the substrate material should be identical or sufficiently similar to the properties of the PIC substrate.

FIG. 5a illustrates a perspective view of the main components of an electro-optical assembly 100 comprising a substrate 102, a PIC 104 and an optical coupling device 106, which is configured to be optically and mechanically connected an MPO connector 168.

As apparent from FIG. 5a, the PIC 104 may be provided on a socket 170 provided on the upper surface of the substrate 102. The upper surface of the socket 170 acts as a support surface of the substrate 102. The PIC 104 may be fixated on the substrate 102 by gluing, preferably by using an epoxy resin. The optical waveguide structure 118 of the PIC 104 may be provided on the upper surface of the PIC 104.

The body part 140 of the optical coupling device 106 may be provided in or above a groove 172 provided in the upper region (surface) of the substrate 102. As regards the optical coupling device 106, the groove 172 acts as means for receiving a glue material (not shown), which can be supplied, in advance of performing the active alignment process, into the groove 172, so that the bottom surface of the body part 140 of the optical coupling device 106 can brought into contact with the glue material and the coupling device 106 can be actively positioned relative to the PIC 104 as described above until an optimum position has been reached. This position of the optical coupling device 106 can be kept constant until the glue material has fully (or at least to a sufficient extent) hardened. As described above, the front edge of the body part 140 of the optical coupling device 106 may be brought into contact with the respective opposing edge of the PIC 104 while performing the active alignment process. Alternatively, a small axial gap between these edges may be present during the alignment process. In both cases, glue material may be provided between the opposing walls of the edges. Of course, in this case, the glue material must be transparent so that the material may act as an immersion medium.

As in the embodiment shown in FIG. 4, the groove 172 may further serve to receive a socket part 174 which may, with its front region facing the body part 140, encompass a rear region of the body part 140 so that inner walls of a receptacle opening 176 of the socket part 174 are positioned relative to the outer circumference of the body part 140 with a sufficient accuracy. Thus, an optical multi-fiber connector 200, e.g. an MPO connector, that is inserted into the receptacle opening 176 of the socket part 174 is positioned relative to the outer circumference of the body part 140 of the optical coupling device 106 with a sufficient accuracy.

As shown in FIG. 5b, the body part 140 of optical coupling device 106 may consist of two parts, namely, a lower part 140a and an upper part 140b. Alignment rods 178 are provided in V-grooves which are provided in at least one of the opposing surfaces of the parts 140a and 140b (in the embodiment shown in FIG. 5b, the V-grooves are provided in both of these parts). The parts 140a and 140b may be fixated to each other by using a glue, e.g. an epoxy resin, between the opposing surfaces and/or in the region of the V-grooves.

The alignment rods 178 extend into the receptacle opening 176 of the socket part 174 and are configured to interact with appropriate alignment bores or holes 202 in the front region of the optical multi-fiber connector 200. The optical waveguide structure 142 of the optical coupling device may be provided on one of the opposing surfaces of the lower part 140a and 140b.

Figure 6:
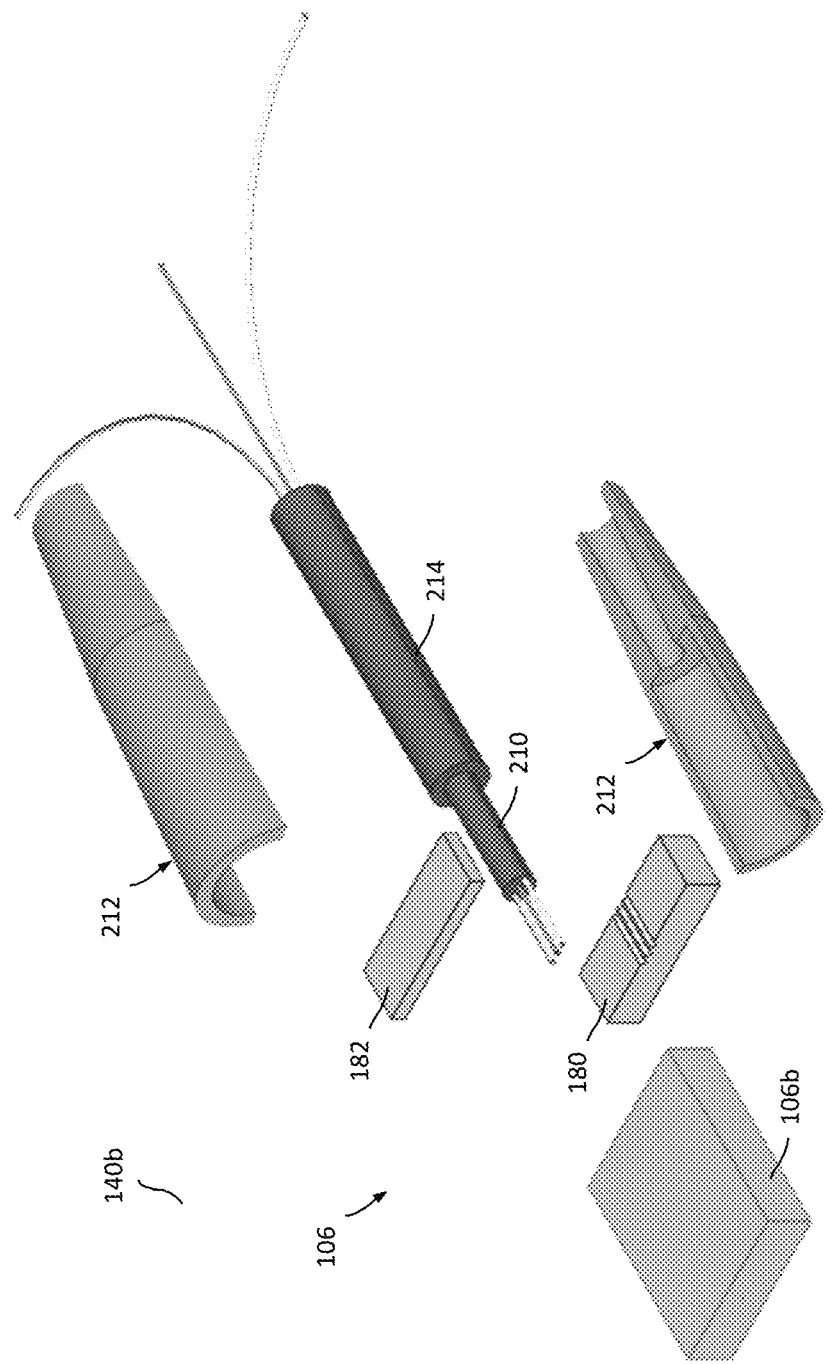
FIG. 6 shows a perspective exploded view of another embodiment similar of a coupling device comprising a first part that features a spot-size converter functionality and a second part that fixates optical fibers to be connected to the PIC.

FIG. 6 illustrates an optical coupling device 106 comprising a front part 106b comprising the optical waveguide structure 142b (e.g. according to the embodiment of FIG. 3 or 4) and a rear part 106a comprising, as optical waveguide structure 142a, optical fibers 144, 146 and 148 of a multi-fiber cable or pigtail 210. As shown in the exploded illustration of FIG. 6, the bare optical fiber ends are inserted into V-grooves in a lower part 180 of the rear part 106a and fixated therein by a cover plate 182. Mounting these parts may be effected by using a glue. A fiber boot 212 consisting of two halfs that are fixated to each other and an additional coating 214 on the pigtail coating or optical cable may be used in order to create a strain relief means. For this purpose, the halves of the fiber boot 212 encompass the additional coating 214, which may be extruded around the coating of the multi-fiber pigtail 210.

As described above in connection with the embodiments according to FIGS. 3 and 4, the rear part 106a may be positioned relative to the front part 106b by using an active alignment process or by using simple passive alignment means. In both cases, the parts 106a and 106b may be fixated to each other by using a glue or any other means appropriate to permanently connect these two parts.

As mentioned above, the front part 106b and the lower part 180 of the rear part 106a may form an integrated part, i.e. the V-grooves are provided in the body part 140 of the optical coupling device 106 in an appropriate manner. In such an embodiment, the optical fibers can simply be inserted into the respective grooves and fixated by the cover part, e.g. using glue. The whole optical coupling device may then be positioned relative to the PIC (that has been mounted onto the substrate) and fixated in the optimum position.

LIST OF REFERENCE SIGNS 100 electro-optical assembly
102 substrate
104 PIC
106 optical coupling device
106a rear part of optical coupling device
106b front part of optical coupling device
108 coherent optical transceiver
110 optical modulator
110a modulator part
110b modulator part
112 optical receiver part
114 2×1 optical combiner
116a transmit signal output port
116b local oscillator signal input port
116b1 local oscillator signal input port
116b2 local oscillator signal input port
116c receive signal input port
118 (integrated) optical waveguide structure of the PIC
120 optical 1×2 splitter
122 monitor opto-electrical converter (monitor diode)
124 monitor opto-electrical converter (monitor diode)
126 electrical amplifier
128 electrical amplifier
130 monitor opto-electrical converter (monitor diode)
132 optical 1×2 splitter
134 electrical amplifier
136 (fast) opto-electrical converter (photodiode)
138 electrical amplifier
140 body part
140a lower part
140b upper part
142 optical waveguides structure
142a optical waveguide structure portion
142b optical waveguide structure portion
144 piece of optical fiber/waveguide structure portion
144a tapered waveguide structure portion
146 piece of optical fiber/waveguide structure portion
146a tapered waveguide structure portion
148 piece of optical fiber/waveguide structure portion
148a tapered waveguide structure portion
150 optical connection
152 optical connection
152a optical connection
152b optical connection
154 optical connection
156 loop waveguide
158 piece of optical fiber/waveguide structure portion
160 piece of optical fiber/waveguide structure portion
162 optical connection
164 optical connection
168 MPO connector
170 socket
172 groove
174 socket part
176 receptacle opening
178 alignment rod
180 cover plate
200 optical multi-fiber connector
202 Alignment bore/hole
204 external opto-electrical converter
210 multi-fiber cable/pigtail
212 fiber boot
214 additional coating
$S_{TX}$ optical transmit signal
$S_{TXh}$ partial optical transmit signal (horizontal polarization)
$S_{TXv}$ partial optical transmit signal (vertical polarization)
$S_{RX}$ optical receive signal
$S_{pos}$ optical position signal
I measurement position
II measurement position
III measurement position

The invention claimed is:

1. An electro-optical assembly comprising
   (a) a substrate having a support surface, and
   (b) a photonic integrated circuit which is mounted with a contact surface on the support surface of the substrate,
   (c) the photonic integrated circuit comprising an integrated optical waveguide structure defining at least two waveguide end faces provided at an edge surface of the photonic integrated circuit, which is perpendicular to its contact surface, wherein the at least two waveguide end faces form optical ports of the photonic integrated circuit, and
   (d) an optical coupling device which is mounted with a contact surface on the support surface of the substrate, the optical coupling device being configured to optically connect at least two optical fibers to the photonic integrated circuit,
   (e) the optical coupling device comprising an optical waveguide structure defining at least two front waveguide end faces provided at a front edge surface of the optical coupling device, which is perpendicular to its contact surface, wherein the number of these front waveguide end faces corresponds to the number of the waveguide end faces of the optical waveguide structure of the photonic integrated circuit,
   (f) wherein the optical coupling device is configured to be positionable during an active positioning process in order to align the at least two front waveguide end faces of the optical waveguide structure of the optical coupling device with the at least two waveguide end faces of the optical waveguide structure of the photonic integrated circuit, and
   (g) wherein the optical coupling device is configured to be permanently fixated on the substrate in an aligned position,
   wherein:
   (h) the electro-optical assembly comprises a coherent optical transceiver comprising an optical modulator and an optical receiver part,
   (i) wherein at least one first monitor opto-electrical converter is comprised by the optical modulator, which is adapted to receive, during a normal operation of the electro-optical assembly, a first local oscillator signal that is fed to the optical modulator via an optical path of the optical waveguide structure comprising a first dedicated waveguide end face thereof, the first dedicated waveguide end face defining a first local oscillator signal input port of the photonic integrated circuit, the at least one first opto-electrical converter being adapted to detect a power portion of an optical transmit signal that is output by the optical modulator and fed to a second dedicated waveguide end face via an optical path of the optical waveguide structure, the second dedicated waveguide end face defining a transmit signal output port of the photonic integrated circuit,
   (j) wherein at least one second monitor opto-electrical converter is comprised by the optical receiver part, the second opto-electrical converter being adapted to detect, during the normal operation of the electro-optical assembly, a power portion of an optical receive signal that is fed to the optical receiver part via an optical path of the optical waveguide structure comprising a third dedicated waveguide end face thereof, the third dedicated waveguide end face a receive signal input port of the photonic integrated circuit, and (k) wherein at least one high-speed opto-electrical converter is comprised by the optical receiver part, the at least one high-speed opto-electrical converter being adapted to measure, during the normal operation of the electro-optical assembly, the optical power that is included in a predetermined signal component of the optical receive signal that has been mixed with a second local oscillator signal, this local oscillator signal being fed to the optical receiver part via an optical path that comprises the first local oscillator signal input port or via an optical path of the optical waveguide structure comprising a fourth dedicated waveguide end face thereof, the fourth dedicated waveguide end face defining a second local oscillator signal input of the photonic integrated circuit, (l) wherein the optical modulator and the optical receiver part are configured such that during the active positioning process,
  (i) in which a single optical positioning signal ($S_{pos}$) that is split into the first and second local oscillator signal or two optical positioning signals having different wavelenghths forming the first and second local oscillator signals, and an optical receive signal ($S_{RX}$) are fed to the waveguide structure of the coupling device,
  (ii) at least one electrical signal corresponding to the optical power measured as a result of feeding the optical positioning signals ($S_{pos}$) that is created by the first or second monitor opto-electrical converters or by at least one of the high-speed opto-electrical converters is made available for a position controller.

2. The electro-optical assembly according to claim 1, wherein the optical waveguide structure of the optical coupling device comprises at least two rear waveguide end faces which are provided at a connecting portion of the optical coupling device, the at least two rear waveguide end faces and the connecting portion being configured to optically connect at least two optical fibers to the optical waveguide structure, the optical waveguide structure of the optical coupling device being configured to realize a mode field converter functionality in such a way that the mode field at each of the at least two rear waveguide end faces essentially equals the mode field of the respective one of the at least one optical fibers to be coupled thereto and that the mode field at each of the at least two front waveguide end faces essentially equals the mode field of the waveguide structure of the photonic integrated chip at the waveguide end face to be coupled thereto.

3. The electro-optical assembly according to claim 1, wherein the optical waveguide structure of the optical coupling device comprises one or more optical splitters.

4. The electro-optical assembly according to claim 1, wherein all of the at least two rear waveguide end faces of the optical coupling device are provided at a rear edge surface thereof, which is perpendicular to its contact surface and realizes the connecting portion, and the optical coupling device is configured to be connected to an external optical connector comprising a corresponding number of optical fibers to be connected to the at least two rear end faces.

5. The electro-optical assembly according to claim 4, wherein the electro-optical assembly comprises connector means which are configured to mechanically connect an external optical connector to the electro-optical assembly and to optically connect the optical fibers to the optical coupling device.

6. The electro-optical assembly according to claim 5, wherein the connector means comprise a socket adapted to align the external optical connector with respect to the connecting portion and to keep the external optical connector in its aligned position.

7. The electro-optical assembly according to claim 5, wherein the optical coupling device comprises a bottom part and an upper part that are connected to each other at surfaces parallel to the contact surface defined by the bottom part, wherein the optical waveguide structure is comprised by the bottom part or the upper part at a surface region of the opposing surfaces.

8. The electro-optical assembly according to claim 7, wherein the optical coupling device comprises one or more alignment rods, which are fixated in a respective groove provided in the bottom part and/or the upper part of the optical coupling device, wherein the one or more alignment rods protrude beyond the rear edge surface of the optical coupling device in a direction perpendicular to the rear edge surface.

9. The electro-optical assembly according to claim 1, wherein the optical waveguide structure of the optical coupling device comprises at least two optical fibers, each of which is fixated in a groove provided in the optical coupling device, wherein each groove is provided in such a way that the end face of the respective optical fiber is kept in an aligned position with a respective one of the at least two rear waveguide end faces.

10. A method of manufacturing an electro-optical assembly according to claim 1, the method comprising the steps of:
  (a) mounting the photonic integrated circuit on the substrate;
  (b) carrying out an active alignment process for aligning the end faces of the photonic integrated circuit and the front waveguide end faces of the optical coupling device, wherein a single optical positioning signal ($S_{pos}$) or two optical positioning signals having different wavelengths, and an optical receive signal ($S_{RX}$) are fed to at least two optical connections each of which is formed by a pair of these end faces to be aligned, wherein the optical coupling device is positioned continuously or stepwise and a power portion of the respective optical signal transmitted over each of the at least two connections is measured and wherein the positioning and measuring is continued until an optimum position is reached, the optimum position being defined by a predetermined maximum value based on the power portions of the optical signals measured;
  (c) fixating the optical coupling device in its optimum position, by means of one or more of a transparent glue and an epoxy resin.

11. The method according to claim 10, wherein the electro-optical assembly comprises one or more of the features of:
  the photonic integrated circuit comprises at least a first and a second opto-electrical converter, which are configured to detect an optical power portion of a respective optical signal ($S_{pos}$) that is guided in a respective first and second optical path of the optical waveguide structure of the photonic integrated circuit, wherein each of the optical paths comprises a waveguide end face of the photonic integrated circuit; and (i) at least one first monitor opto-electrical converter is comprised by an optical modulator of the optical transceiver, which is adapted to receive, during a normal operation of the electro-optical assembly, a first local oscillator signal that is fed to the optical modulator via an optical path of the optical waveguide structure comprising a dedicated waveguide end face thereof, this waveguide end face defining a first local oscillator signal input port of the photonic integrated circuit, the at least one first opto-electrical converter being adapted to detect a power portion of an optical transmit signal that is output by the optical modulator and fed to a dedicated waveguide end face via an optical path of the optical waveguide structure, this waveguide end face defining a transmit signal output port of the photonic integrated circuit, (ii) at least one second monitor opto-electrical converter is comprised by an optical receiver part of the optical transceiver; the second opto-electrical converter being adapted to detect a power portion of an optical receive signal that is fed to the optical receiver part via an optical path of the optical waveguide structure comprising a dedicated waveguide end face thereof, this waveguide end face defining a receive signal input port of the photonic integrated circuit, and (iii) at least one high-speed opto-electrical converter is comprised by the optical receiver part, the at least one high-speed opto-electrical converter being adapted to measure the optical power that is included in a predetermined signal component of the optical receive signal that has been mixed with a second local oscillator signal, this local oscillator signal being fed to the optical receiver part via an optical path of the optical waveguide structure comprising a dedicated waveguide end face thereof, this waveguide end face defining a second local oscillator signal input port of the photonic integrated circuit, and wherein a single optical positioning signal ($S_{pos}$) and an optical receive signal ($S_{RX}$) fed to a dedicated one of the rear waveguide end faces of the optical coupling device that are optically connected to those front waveguide end faces of the optical coupling device which are to be aligned with the waveguide end faces of the photonic integrated circuit waveguide structure that are monitored by the first and second opto-electrical converter, and electrical signals created by the first and second opto-electrical converters are used to optimize the position of the optical coupling device with respect to the photonic integrated circuit.

12. The method according to claim 10, wherein the electro-optical assembly comprises the features of: (i) at least one first monitor opto-electrical converter is comprised by an optical modulator of the optical transceiver, which is adapted to receive, during a normal operation of the electro-optical assembly, a first local oscillator signal that is fed to the optical modulator via an optical path of the optical waveguide structure comprising a dedicated waveguide end face thereof, this waveguide end face defining a first local oscillator signal input port of the photonic integrated circuit, the at least one first opto-electrical converter being adapted to detect a power portion of an optical transmit signal that is output by the optical modulator and fed to a dedicated waveguide end face via an optical path of the optical waveguide structure, this waveguide end face defining a transmit signal output port of the photonic integrated circuit, (ii) at least one second monitor opto-electrical converter is comprised by an optical receiver part of the optical transceiver; the second opto-electrical converter being adapted to detect a power portion of an optical receive signal that is fed to the optical receiver part via an optical path of the optical waveguide structure comprising a dedicated waveguide end face thereof, this waveguide end face defining a receive signal input port of the photonic integrated circuit, and (iii) at least one high-speed opto-electrical converter is comprised by the optical receiver part, the at least one high-speed opto-electrical converter being adapted to measure the optical power that is included in a predetermined signal component of the optical receive signal that has been mixed with a second local oscillator signal, this local oscillator signal being fed to the optical receiver part via an optical path of the optical waveguide structure comprising a dedicated waveguide end face thereof, this waveguide end face defining a second local oscillator signal input port of the photonic integrated circuit, and wherein (a) the optical modulator is controlled to create an optical transmit signal ($S_{TX}$) using a first local oscillator signal that is fed, via the optical waveguide structure of the optical coupling device, to the first local oscillator signal input port, the optical transmit signal ($S_{TX}$) being output at the transmit signal output port, wherein at least a power portion of the optical transmit signal ($S_{TX}$) is measured by the at least one first monitor opto-electrical converter and wherein the optical transmit signal ($S_{TX}$) which has passed through the optical waveguide structure of the optical coupling device or a power portion thereof is measured, and (b) an optical receive signal ($S_{RX}$) is fed to a respective rear waveguide end face of the optical coupling device and, via the optical waveguide structure of the optical coupling device, to the receive signal input port, and at least a power portion of the optical receive signal ($S_{RX}$) is measured by using the at least one second monitor opto-electrical converter, (iii) wherein the measured signal portions or components are used to optimize the position the optical coupling device.

13. The method according to claim 12, wherein a second local oscillator signal that is fed, via the optical waveguide structure of the optical coupling device, to the second local oscillator signal input port, and that the optical receiver is controlled to measure one or more components of the optical receive signal that are created by using the optical receive signal ($S_{RX}$) and the second oscillator signal by using the at least one high-speed opto-electrical converter.

14. The method according to claim 12, wherein the first and second local oscillator signal have different wavelengths and are fed to respective different rear waveguide end faces of the optical coupling device, and that the optical transmit signal ($S_{TX}$) which has passed through the optical waveguide structure of the optical coupling device or a power portion thereof is measured using an external monitor opto-electrical converter.

15. The method according to claim 12, wherein the first and second local oscillator signals have identical wavelengths, that the optical transmit signal ($S_{TX}$) that is output at a respective rear waveguide end face of the optical coupling device is fed, via an optical fiber loop, to a respective rear waveguide end face that is optically connected to a front waveguide end face of the optical coupling device which is to be connected to the receive signal input port of the photonic integrated circuit, wherein the optical transmit signal ($S_{TX}$) created by the optical modulator forms the optical receive signal ($S_{RX}$).

16. The method according to claim 15, wherein a single local oscillator signal is fed to a rear waveguide surface of the optical coupling device and that the optical waveguide structure of the optical coupling device comprises an optical 1×2 splitter, preferably a polarization maintaining optical 1×2 splitter, which is configured to split the local oscillator signal and to feed a first and a second power portion thereof to the respective front waveguide end faces as the first and second local oscillator signal, respectively.

17. The electro-optical assembly according to claim 1, wherein a single optical positioning signal (Spos) is fed to the waveguide structure of the coupling device and the optical transmit signal that is output at a respective rear waveguide end face of the optical coupling device is fed, via an optical fiber loop, to the waveguide structure of the coupling device as optical receive signal.

* * * * *